United States Patent
Suzuki et al.

[11] Patent Number: 5,814,954
[45] Date of Patent: Sep. 29, 1998

[54] METHOD OF AND AN APPARATUS FOR PROTECTING A REGENERATIVE RESISTOR IN AN INVERTER FOR DRIVING A SERVOMOTOR

[75] Inventors: Naoyuki Suzuki; Shinichi Horikoshi, both of Oshino-mura, Japan

[73] Assignee: Fanuc Ltd., Yamanashi, Japan

[21] Appl. No.: 765,855

[22] PCT Filed: Apr. 30, 1996

[86] PCT No.: PCT/JP96/01185

§ 371 Date: Dec. 23, 1996

§ 102(e) Date: Dec. 23, 1996

[87] PCT Pub. No.: WO96/34450

PCT Pub. Date: Oct. 31, 1996

[30] Foreign Application Priority Data

Apr. 28, 1995 [JP] Japan ................................. 7-127507

[51] Int. Cl.⁶ ............................................................. H02P 3/14
[52] U.S. Cl. ........................... 318/376; 364/483; 307/68; 318/783; 318/471; 318/490
[58] Field of Search .................................. 318/376, 783, 318/471, 490; 364/483; 307/68 C

[56] References Cited

U.S. PATENT DOCUMENTS 3,584,241  6/1971  Nakamura ........................ 318/376 X
4,695,961  9/1987  Arinobu ............................ 364/483 X

FOREIGN PATENT DOCUMENTS 60-13485   1/1985  Japan.
63-161886  7/1988  Japan.
2-26340    2/1990  Japan.
2-211083   8/1990  Japan.

*Primary Examiner*—Karen Masih
*Attorney, Agent, or Firm*—Staas & Halsey

[57] ABSTRACT

A protecting method and apparatus for a regenerative resistor in which a regenerative resistor is satisfactorily protected from a thermal breakage caused by an over-regeneration by combining a projection of the regenerative resistor by a thermostat and a protection of the regenerative resistor by an analog simulation circuit and by coordinating protective regions of these two protections. The heat-responsive switch (2) stops power supply to a DC link (10) when the temperature of the regenerative resistor is increased to a predetermined value or greater value. The analog simulation circuit (1) is provided with a charge-discharge circuit to be charged and discharged in response to a regenerative pulse signal from a level detector (7), estimates the quantity of heat accumulated in the regenerative resistor (5) by means of the charge-discharge circuit, and stops power supply to the DC link (10) when a predetermined threshold value is exceeded by the estimated value. A fusing region of the regenerative resistor (5) is covered by at least one of the protective regions based on the heat-responsive switch (2) and the analog simulation circuit (1).

7 Claims, 9 Drawing Sheets

Ton : REGENERATION TIME
Toff : NON-REGENERATION TIME
T : ONE PERIOD
D : DUTY (=Ton/T)

Wd : REGENERATIVE POWER (= (VDC'/RD)·D)
VDC : DC LINK VOLTAGE
Rd : REGENERATIVE RESISTANCE VALUE

FIG. 18
PRIOR ART

METHOD OF AND AN APPARATUS FOR PROTECTING A REGENERATIVE RESISTOR IN AN INVERTER FOR DRIVING A SERVOMOTOR

TECHNICAL FIELD

The present invention relates to an inverter for controlling an operation of a servomotor, and more particularly, to a method of and an apparatus for protecting a regenerative resistor connected to an inverter.

BACKGROUND ART

Figure 12:
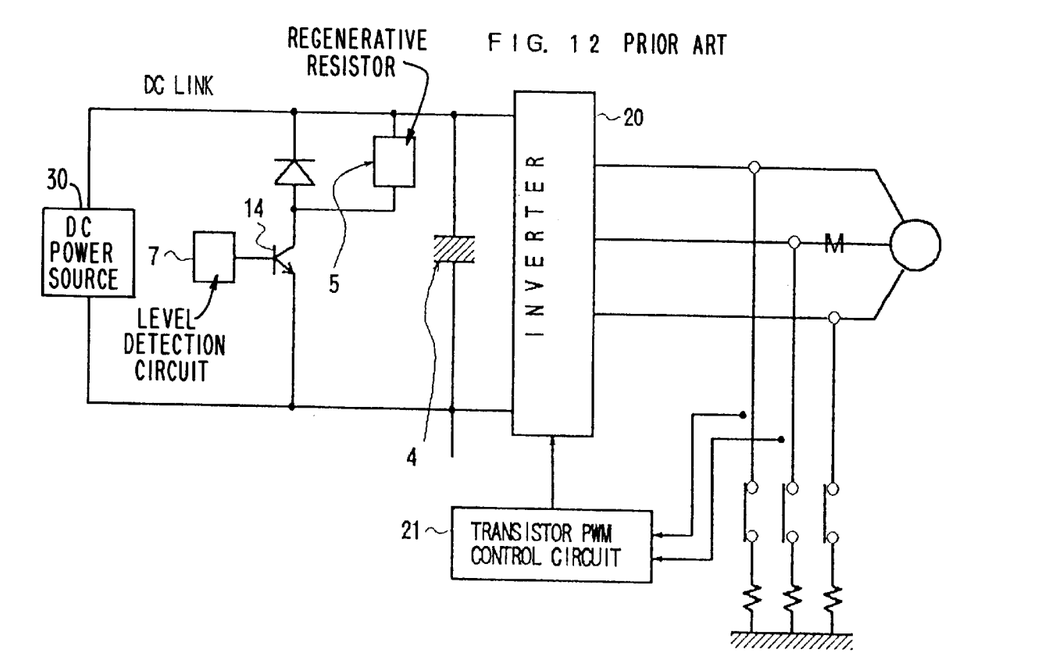
FIG. 12 is a diagram showing conventionally known inverter control for a servomotor.

FIG. 12 shows a conventionally known inverter-type control device for a servomotor. In FIG. 12, a DC link 10 connects a power supply unit 30 for rectifying an alternating current from an AC power source and for supplying DC power, and an inverter 20 for inverting a DC voltage from the power supply unit 30 and for supplying it to a motor M. The inverter 20 is controlled by, for example, a transistor PWM control circuit 21.

In a control of a servomotor by the inverter 20, a smoothing capacitor 4 is connected to the DC link 10. A voltage applied to the capacitor 4 changes depending on the operation modes of the motor, including acceleration, constant-speed, and deceleration modes. In the acceleration mode, for example, electric power is supplied from the power supply unit to the motor, so that the voltage drops. In the deceleration mode, in contrast with this, energy is returned from the motor to the power supply unit, so that the voltage rises.

While a field capacitor is used as the smoothing capacitor 4, for example, the capacitor used has a predetermined dielectric strength level. If a voltage higher than the dielectric strength level is applied to such a capacitor, the capacitor will get out of order.

Thus, the capacitor 4 is protected by connecting a regenerative resistor 5 in parallel with the capacitor 4. In FIG. 12, a level detection circuit 7 turns on a transistor 14 to connect the regenerative resistor 5 with the DC link 10 when it detects that the voltage of the DC link 10 has become equal to or higher than a set voltage. By doing so, electric current is made to flow through the regenerative resistor 5 so that the voltage applied to the capacitor 4 is lowered. The regenerative resistor 5 generates heat corresponding to the applied power, thereby consuming an excess power due to excess voltage.

If the regenerative resistor 5 consumes the excess power due to excess voltage until over-regeneration occurs, the regenerative resistor 5 itself is thermally broken to be fused, and becomes unable to protect the capacitor. It is necessary, therefore, to protect the regenerative resistor and cut off a power supply circuit from the servomotor, thereby protecting the motor and the supply circuit, by detecting the over-regeneration before the regenerative resistor is fused.

Figure 13:
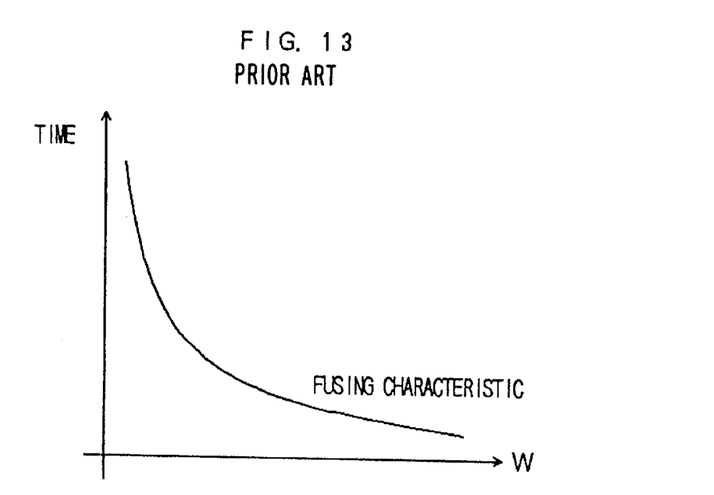
FIG. 13 is a diagram showing the fusing characteristic of the regenerative resistor.

The voltage of the DC link and its fluctuation can be satisfactorily coped with by using a resistor with an adequately large capacity (wattage) as the regenerative resistor 5. In order for the regenerative resistor to be increased in capacity, however, its volume needs to be increased to withstand a large amount of heat resulting therefrom. In view of the packaging space and cost of the regenerative resistor, however, it is to be desired that the regenerative resistor for the inverter should have as small a capacity as possible. In general, a regenerative resistor has a fusing characteristic such as the one shown in FIG. 13, and will be fused in a short time if an excessive electric power is applied to it.

Conventionally, therefore, the regenerative resistor is protected by the following method, for example.

Figure 14:
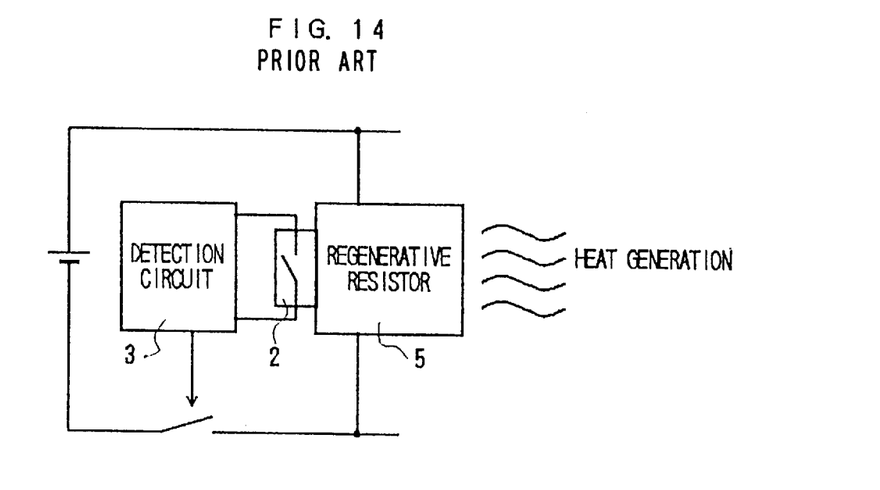
FIG. 14 is a diagram showing the protection of a regenerative resistor by means of a conventional thermostat.

(1) Protecting method using a thermostat: FIG. 14 is a diagram for illustrating protection of the regenerative resistor by means of a conventional thermostat. In FIG. 14, a thermostat 2 is attached to the regenerative resistor 5 which is connected with the DC link 10. The thermostat 2 is opened and closed in accordance with heat generated by the regenerative resistor 5. A detection circuit 3 detects the opening and closing the thermostat 2. In the case of over-regeneration, the circuit 3 gives an alarm to stop the voltage application to the regenerative resistor, and cuts off the DC power supply unit, thereby protecting the regenerative resistor 6 and the servomotor.

Figure 15:
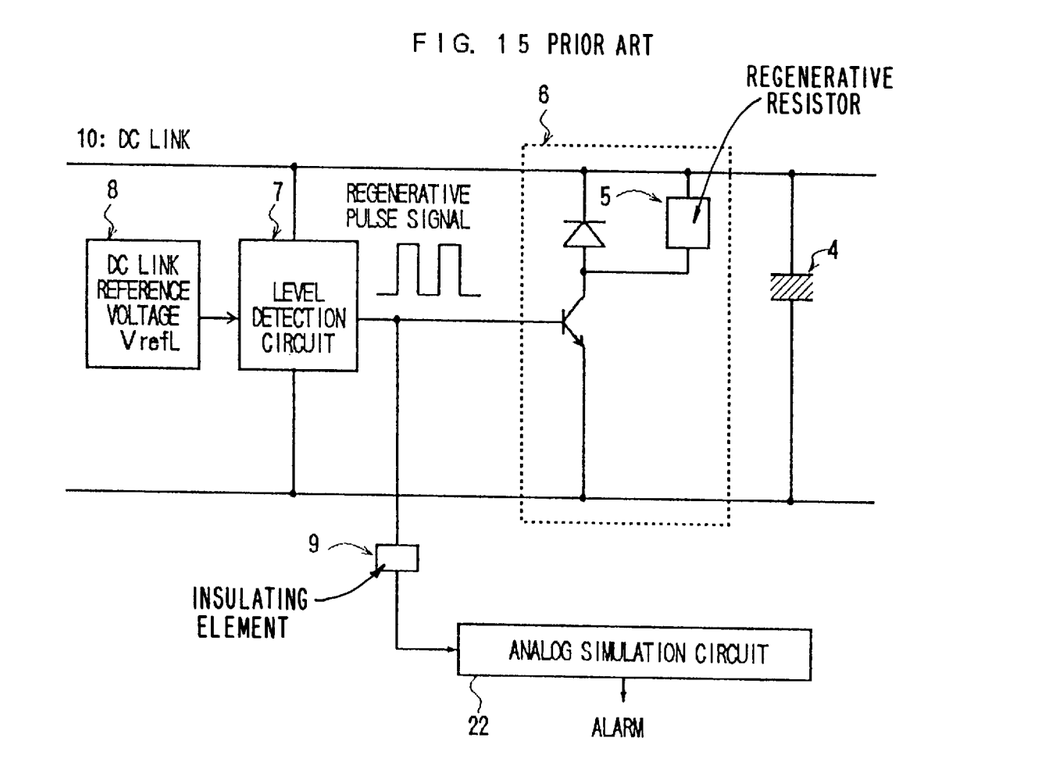
FIG. 15 is a diagram showing the protection of the regenerative resistor by means of a conventional analog simulation circuit.
Figure 16:
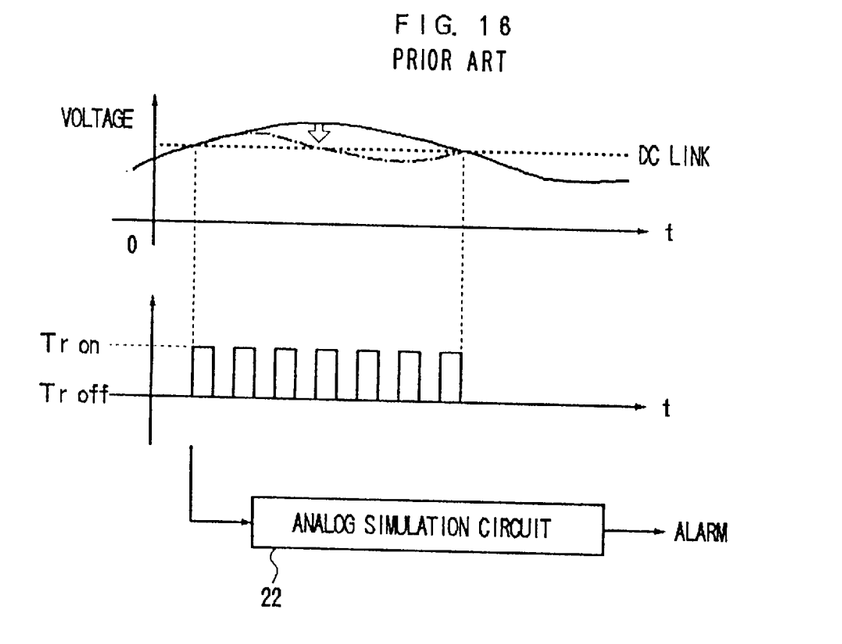
FIG. 16 is a diagram showing the operation of the analog simulation circuit.

(2) Protecting method using an analog simulation circuit: FIG. 15 is a diagram for illustrating protection of the regenerative resistor by means of a conventional analog simulation circuit. Referring to FIG. 15, a regenerative pulse signal delivered from the level detection circuit 7 is guided to the analog simulation circuit 22 through an insulating element 9 such as a photocoupler. As shown in FIG. 16, the analog simulation circuit 22 detects the pulse width and supply time of the regenerative pulse signal supplied to a regenerative circuit 6, and estimates the regeneration level of the regenerative circuit 6. If a set or higher regeneration level is reached, the circuit 22 gives an alarm to stop the voltage application to the regenerative resistor 5, and cuts off the DC link, thereby protecting the regenerative resistor 5 and the servomotor.

However, the conventional protecting method for the regenerative resistor of the inverter for servomotor involves a problem that the regenerative resistor can not be satisfactorily protected from a thermal breakage by the over-regeneration.

For example, the protecting method using a thermostat can protect the regenerative resistor from the thermal breakage resulting from the over-regeneration by detecting the over-regeneration in a case where a low regenerative power continues for a relatively long time, but it cannot respond to the thermal breakage in a case where a high regenerative power is generated in a short time, thus failing to protect the regenerative resistor.

In contrast, the protecting method using an analog simulation circuit can protect the regenerative resistor from the thermal breakage resulting from the over-regeneration by detecting the over-regeneration in a case where a high regenerative power is generated in a short time, but it cannot respond to the thermal breakage in a case where a low regenerative power continues for a relatively long time, thus failing to protect the regenerative resistor.

Figure 17:
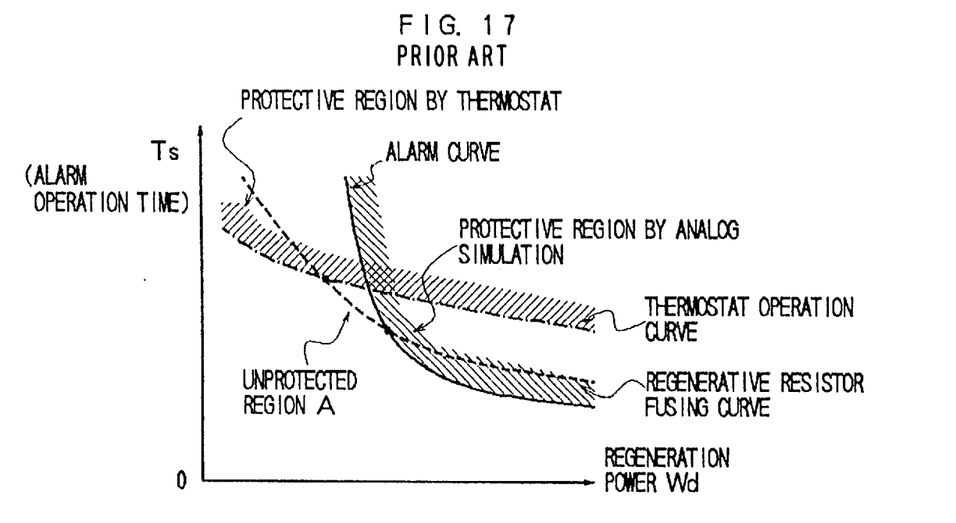
FIG. 17 is a diagram showing protective regions according to a conventional regenerative resistor protecting method.

FIG. 17 is a diagram for illustrating protective regions according to the conventional regenerative resistor protecting methods. In FIG. 17, the axis of abscissa represents regenerative power Wd, while the axis of ordinate represents an alarm operation time Ts, that is, the required bore an alarm is given in each protecting method. Also, a broken line indicates a regenerative resistor fusing curve, a dashed line and a hatched region based on the dashed line indicate a protective region covered by the thermostat, and a full line and a hatched region based on the full line indicate an alarm line and a protective region covered by the analog simulation circuit, respectively.

As shown in FIG. 17, the protective region in which an alarm can be given before the regenerative resistor fuses corresponds to the case where the regenerative power and alarm operation time for the thermostat are low and long, respectively, or to the case where the regenerative power and alarm operation time for the analog simulation circuit are high and short, respectively. Thus, each protecting method involves a region in which the regenerative resistor cannot be protected.

Thus, it can be considered to enlarge the protective regions for the regenerative resistor by combining the two protecting methods. If these methods are simply combined, however, there will be a region that cannot be covered by either of the two protecting methods like the case of the portion corresponding to the regenerative resistor fusing curve indicated by A in FIG. 17 depending on the situation. If regenerative operation in this region occurs, the regenerative resistor will suffer thermal breakage.

Figure 18:
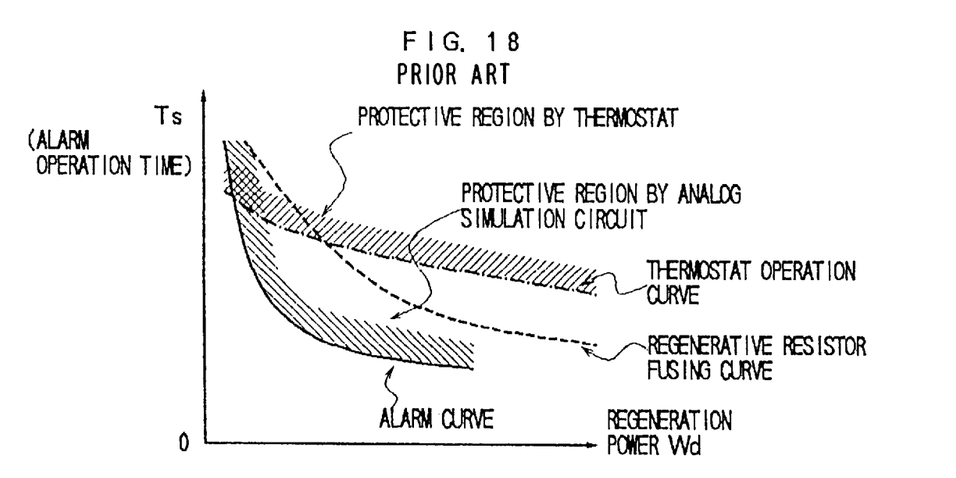
FIG. 18 is a diagram showing the adjustment of an alarm curve based on the conventional analog simulation circuit.

In order to protect the regenerative resistor throughout its fusing curve, therefore, the alarm curve must be adjusted in the manner shown in FIG. 18. With this adjusted alarm curve the regenerative resistor can be protected, but, since an alarm is actuated within a range in which the respective values of the regenerative power and alarm operation time are smaller than values represented by the fusing curve of the regenerative resistor, the servomotor operates in a range lower than its rating, thereby giving rise to a problem that the characteristics of the servomotor will inevitably be lowered.

Also, the parameter adjustment for the conventional analog simulation circuit is complicated, and fine adjustment for each regenerative resistor is difficult.

DISCLOSURE OF INVENTION

The object of the present invention is to provide a protection method and a protection circuit for a regenerative resistor in an inverter for a servomotor, which is capable of satisfactorily protecting the regenerative resistor from a thermal breakage by an over-regeneration.

More specifically, the object is to provide a protection method and a protection circuit for a regenerative resistor in an inverter of a servomotor, which is capable of coordinating protective regions for the regenerative resistor by a thermostat and by an analog simulation circuit when these two protections are combined.

According to a first aspect of the present invention, a protecting apparatus for a regenerative resistor comprises: level detecting means for a detecting a voltage produced in a DC link by a regenerative power from a servomotor and for outputting a regenerating pulse signal when the detected voltage exceeds a first reference voltage; switching means for applying a DC link voltage to a regenerative resistor in response to the regenerative pulse signal; first protecting means for protecting the regenerative resistor by stopping power supply to the DC link when the temperature of the regenerative resistor is increased to a predetermined value or greater; and a second protecting means having a charge-discharge circuit to be charged and discharged in response to the regenerative pulse signal outputted from the level detecting means and a comparator circuit for comparing the voltage of the charge-discharge circuit with a second reference voltage, for protecting the regenerative resistor by stopping power supply to the DC link when the voltage of the charge-discharge circuit exceeds the second reference voltage, wherein a fusing region of the regenerative resistor is adjusted to be within at least one of a protective region by the first protecting means and a protective region by the second protecting means.

The first protecting means can be realized by a thermostat as a heat-responsive switching device, for example.

In the second protecting means, the protective region of the analog simulation means can be adjusted by the charge-discharge time constant of the charge-discharge circuit, and the adjustment of the charge time constant of the charge-discharge circuit can be achieved by varying the resistance value of a resistor connected in series with a capacitor that constitutes the charge-discharge circuit.

According to a second aspect of the present invention, a protecting method for a regenerative resistor comprises the steps of: performing a first protecting operation of stopping power supply to a DC link when the temperature of a regenerative resistor is increased to a first predetermined value or greater; performing a second protecting operation of estimating a quantity of heat accumulated in the regenerative resistor by a charge-discharge circuit to be charged and discharged in response to a regenerative pulse signal and for stopping power supply to the DC link when the estimated quantity of heat exceeds a second predetermined value; and adjusting the charge-discharge circuit so that a fusing region of the regenerative resistor is continuously covered by the first protecting operation and the second protecting operation.

According to a third aspect of the present invention, a method of protecting a regenerative resistor comprises the steps of: setting a protective region of first protecting means for stopping power supply to a DC link when the temperature of a regenerative resistor is increased to a first predetermined value or greater; setting a protective region of second protecting means for estimating a quantity of heat accumulated in the regenerative resistor by the charge-discharge circuit to be charged and discharged in response to a regenerative pulse signal and for stopping power supply to the DC link when the estimated quantity of heat exceeds a second predetermined value so that a fusing region of the regenerative resistor which is not covered by the protective region of the first protecting means is covered; and determining the circuit constant of the charge-discharge circuit having the set protective region.

According to a fourth aspect of the present invention, a protecting method for a regenerative resistor comprises the steps of: providing first protecting means for stopping power supply to a DC link when the temperature of a regenerative resistor is increased to a first predetermined value or greater; providing second protecting means having a capacitor and a resistor connected in series with the capacitor, for estimating a quantity of heat accumulated in the regenerative resistor by a charge-discharge circuit to be charged and discharged in response to a regenerative pulse signal and for stopping power supply to the DC link when the estimated quantity of heat exceeds a second predetermined value; setting a plurality of charge-discharge characteristics of the charge-discharge circuit based on the capacity of the capacitor of the second protecting means and the resistance value of the resistor as parameters, and selecting a charge-discharge characteristic for covering a fusing region of the regenerative resistor which is not covered by the protective region of the first protecting means from among a plurality of charge-discharge characteristics; and obtaining the value of the parameter corresponding to the selected charge-discharge characteristic to determine the charge-discharge circuit.

BEST MODE FOR CARRYING OUT THE INVENTION

Figure 1:
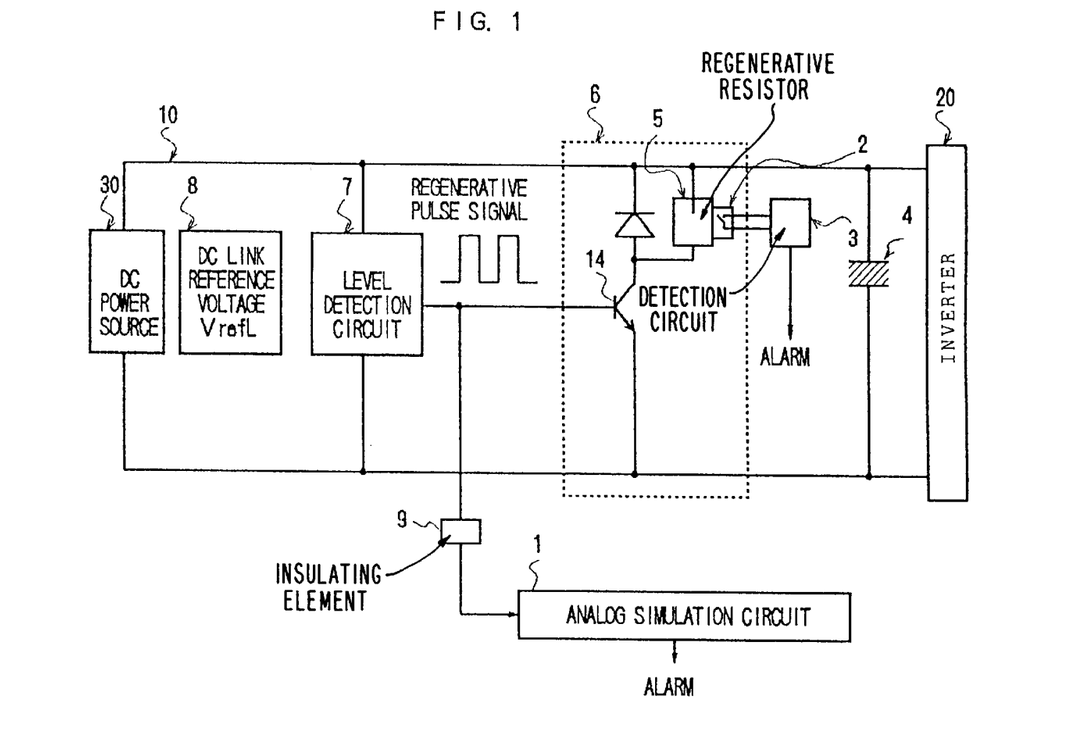
FIG. 1 is a block diagram showing a regenerative resistor protecting apparatus for a servomotor inverter according to one embodiment of the present invention.

In FIG. 1, a DC link 10 connects a DC power supply unit 30 and an inverter 20, and supplies power to a servomotor. The DC link 10 is connected with a smoothing capacitor 4 such as a field capacitor, and a regenerative circuit 6 for protecting the capacitor 4 in case of over-regeneration is connected to the DC power supply unit 10 in parallel with the capacitor 4. The regenerative circuit 6, which may be composed of an IGBT, for example, converts energy produced in case of over-regeneration into heat by means of a regenerative resistor 5.

A level detection circuit 7 detects the voltage of the DC link 10, and delivers a regenerative pulse signal when the detected DC link voltage exceeds a reference value. In response to the regeneration pulse signal from the level detection circuit 7, the regeneration circuit 6 energizes the regenerative resistor 5. A voltage VrefL from a DC link reference voltage source 8 may be used as the reference value for the level determination by the level detection circuit 7.

The regenerative resistor protecting apparatus according to the present invention is provided with a first protecting device, which includes a thermostat 2 as a heat-responsive switching device attached to the regenerative resistor 5. The thermostat 2 opens or closes its contacts depending on a temperature change that is attributable to the heat generated in the regenerative resistor 5 by regenerative operation. The open-close operation of the thermostat 2 is detected by means of a detection circuit 3, and an alarm or some other signal is outputted when the temperature is not lower than set point, for example. In response to this alarm signal, the power for the DC link 10 is cut off to protect the regenerative resistor, and stopping the motor and other processes are carried out. Sources of electric power supply include the DC power supply 30, which supplies electric power form a three-phase AC source of, for example, 200 volts through a diode bridge, and electric power produced by the regenerative energy of the motor. When an alarm is given to indicate over-regeneration, both these sources of supply are disconnected electrically from the DC link 10, so that electric power is cut off from the DC link 10. In this state, only energy accumulated in the capacitor 4 of the DC link 10 is discharged through the regenerative resistor 5.

In the regenerative resistor protecting apparatus according to the present invention, moreover, a regenerative pulse signal delivered from the regenerative circuit 6 is inputted to an analog simulation circuit 1, for use as a second protecting device, through an insulation element 9 such as a photocoupler. The analog simulation circuit 1 detects the pulse width and supply time of the regenerative pulse signal supplied to the regenerative circuit 6, and estimates the regeneration level of the regenerative circuit 6. If a set or higher level is reached by the estimated regeneration level, the circuit 1 gives an alarm to cut off the electric power from the DC link 10, thereby protecting the regenerative resistor, and carrying out stopping of the motor and other processes.

Figure 2:
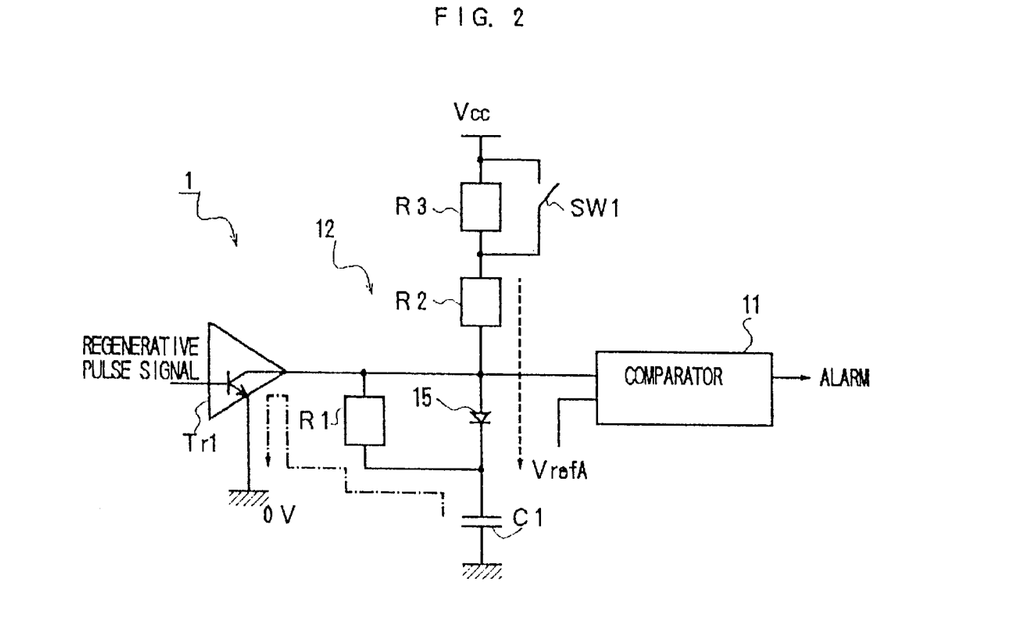
FIG. 2 is a block diagram showing an example of an arrangement of an analog simulation circuit of the present invention.

As shown in FIG. 2, the analog simulation circuit 1 is provided with a charge-discharge circuit 12, which is charged and discharged in response to the regenerative pulse signal from the level detection circuit 7, and a comparator 11 for comparing the voltage charged by the charge-discharge circuit 12 with a reference voltage VrefA.

The charge-discharge circuit 12 includes a charge circuit section, which is formed by, for example, connecting a capacitor C1 and resistors R2 and R3 in series, grounding one end, and applying a predetermined voltage Vcc to the other end, and a discharge circuit section, which is formed by a resistor R1 connected between the ground and a contact between the capacitor C1 and the resistor R2. The output end of a transistor Tr1 is connected to the contact between the capacitor C1 and the resistor R2 and to one end of the resistor R1, and the charge-discharge circuit 12 is charged and discharged responding to the regenerative pulse signal as a trigger The voltage of the capacitor C1 is applied to the input of the comparator 11 through a reversely-connected diode 15. Voltage comparison is effected based on the reference voltage VrefA as a threshold value, and an alarm signal is outputted when the reference voltage VrefA is exceeded by the voltage with which the capacitor C1 is charged.

A switch SW1 can be connected in parallel with the resistor R3 in the charge circuit section. The charge-discharge time constant can be changed by opening or closing the switch SW1.

Figure 3:
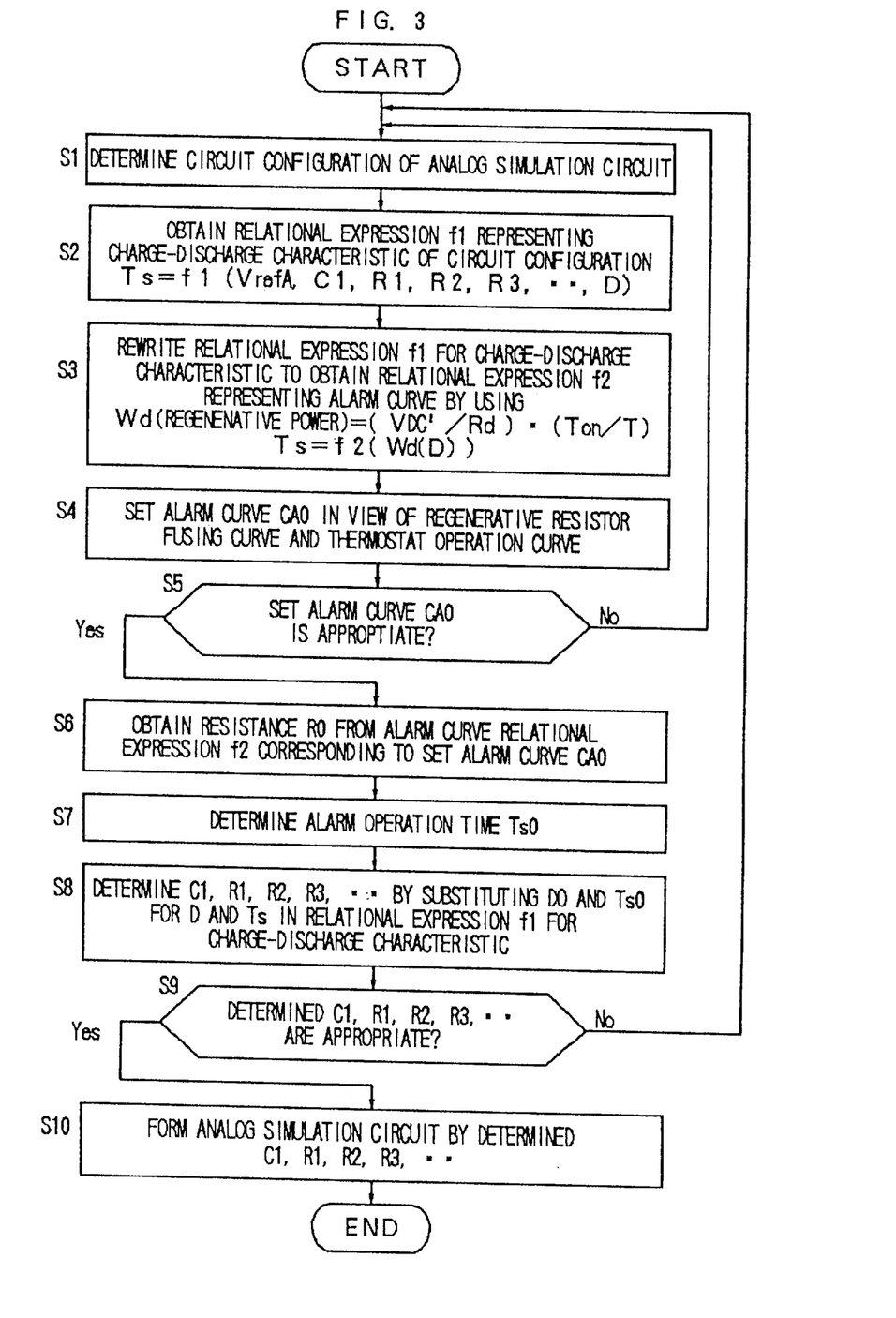
FIG. 3 is a flowchart of a regenerative resistor protecting method for a servomotor inverter of the present invention.

FIG. 3 is a flowchart for illustrating the operation of an embodiment of the present invention, and FIGS. 4 to 9 are diagrams for illustrating the operation according to the embodiment of the present invention. Hereinafter, an description will be made referring to the flowchart of FIG. 3. According to the present invention, the first protecting device based on the thermostat and the second protective device based on the analog simulation circuit are used in combination with each other, and protective regions for the regenerative resistor are continuously protected by adjusting the circuit characteristics of the analog simulation circuit.

Step S1: The circuit configuration of the analog simulation circuit as the second protecting device is settled. The following is a description of the analog simulation circuit that employs the circuit configuration shown in FIG. 2.

Step S2: A relational expression indicative of the charge-discharge characteristic is obtained from the circuit configuration of the charge-discharge circuit of the employed analog simulation circuit. This relational expression for the charge-discharge characteristic is given by f1.

Figure 4:
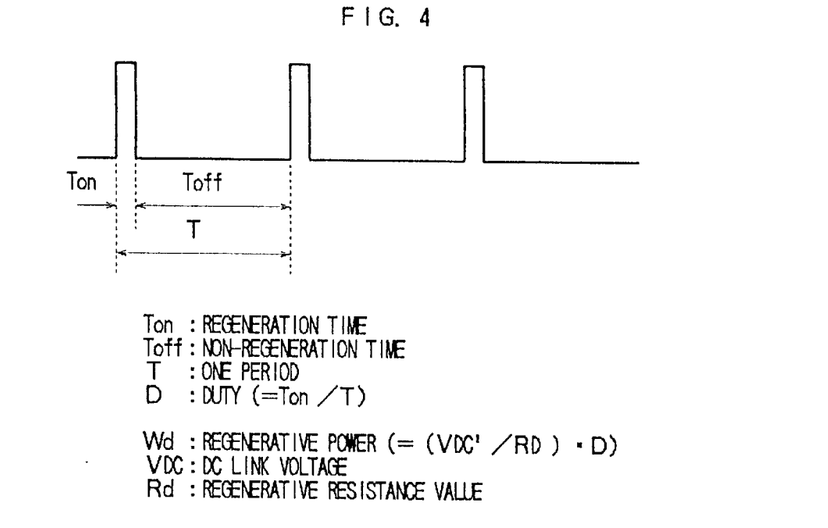
FIG. 4 is a diagram for illustrating a duty factor of regenerative operation.

The relational expression f1 for the charge-discharge characteristic can be given by the following equation (1) as a function for determining the alarm operation time Ts, using the capacitor C1 and the resistors R1, R2 and R3, which constitute the charge-discharge circuit, alarm operation reference voltage VrefA and a duty D for the regenerative operation as parameters.

$$Ts = f1(VrefA, C1, R1, R2, R3, D), \qquad (1)$$

where the duty factor D for regenerative operation is given by the ratio (=Ton/T) of a regenerative time Ton to each period T of regenerative operation, as shown in FIG. 4.

In FIG. 2, when the transistor Tr1 is turned off in response to the regenerative pulse signal delivered from the level detection circuit 7 to the transistor Tr1, the voltage Vcc is applied to the capacitor C1, and charging is performed (as indicated by the broken-line arrow in FIG. 2) with a time constant that is dependent on the resistor R2 (or series resistor formed of the resistors R2 and R3) and the capacitor C1. On the other hand, when the transistor Tr1 is turned on, electric charge accumulated in the capacitor C1 is discharged through the resistor R1 and the transistor Tr1 (as indicated by the dashed-line arrow in FIG. 2) with a time constant that is dependent on the resistor R1 and the capacitor C1.

Figure 5:
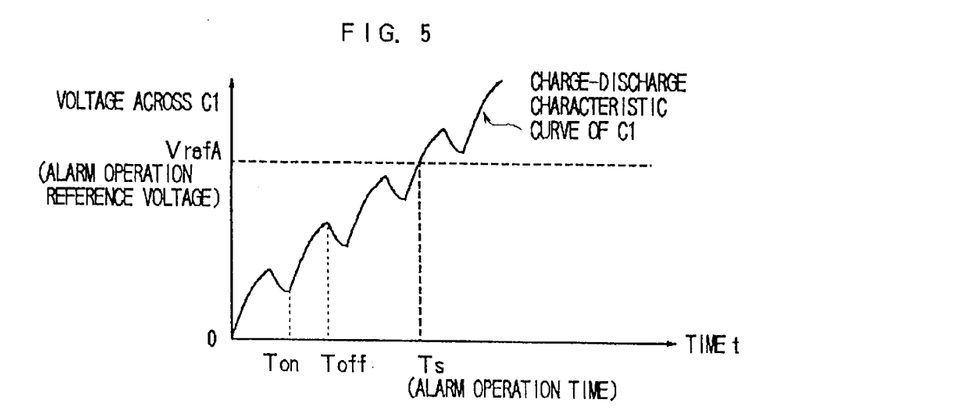
FIG. 5 is a diagram showing a charge-discharge characteristic based on the regenerative operation of a charge-discharge circuit.
Figure 6:
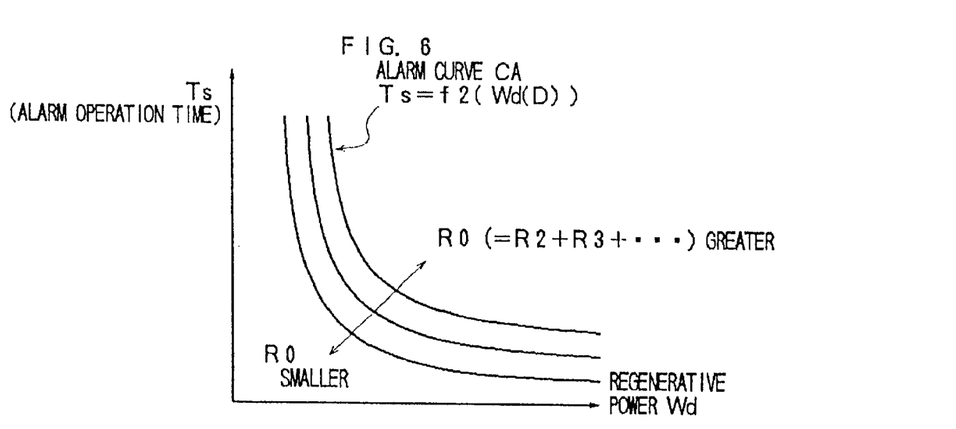
FIG. 6 is a diagram for illustrating the dependence of regenerative operations represented by alarm curves on the duty factor.

The charge-discharge characteristic based on the regenerative operation of the charge-discharge circuit can be represented by the characteristic shown in FIG. 5, for example. In FIG. 5, a full line represents a charge-discharge characteristic curve of the capacitor C1. The capacitor C1 is charged so that the voltage across it rises during the regeneration time Ton for the regenerative operation, and is discharged so that the voltage across it drops during a non-regeneration time Toff for the regenerative operation. When the regenerative operation is continued, the voltage across the capacitor C1 gradually rises as the rise and drop of the voltage are repeated. The voltage of the capacitor C1 represents the regeneration level of the regenerative circuit 6 obtained in response to the regenerative pulse signal supplied to the regenerative circuit 6. The analog simulation circuit 1 compares the voltage across the capacitor C1 with the alarm operation reference voltage VrefA, and generates an alarm at the alarm operation time Ts when the alarm operation reference voltage VrefA is exceeded.

Thus, the alarm operation time Ts varies depending on the respective values of the capacitor C1 and the resistors R1, R2 and R3, which constitute the charge-discharge circuit, regenerative operation duty factor D, and alarm operation reference voltage VrefA, as indicated by the expression (1).

Step S3: Then, the relational expression (1), which is indicative of the charge-discharge characteristic and is obtained in Step S2, is transformed to obtain a relational expression indicative of an alarm curve that represents a characteristic of the analog simulation circuit that generates an alarm. In the description to follow, this relational expression for the alarm curve is given as f2.

Regenerative power Wd consumed by the regenerative resistor during the regenerative operation can be given by the following expression (2).

$$Wd = (V_{DC}^2/Rd) \cdot D, \qquad (2)$$

where $V_{DC}$ is the voltage of the DC link 10 applied to the regenerative resistor 5, and Rd is the resistance value of the regenerative resistor 5.

Based on the expression (2) for the regenerative power Wd and the expression (1), the alarm operation time Ts can be given by the following expression (3) as a function of the regenerative power Wd having the duty factor D as a variable.

$$Ts = f2\{Wd(D)\}. \qquad (3)$$

In the case of the analog simulation circuit shown in FIG. 2, for example, the alarm operation time Ts is given by the following expression (4).

$$Ts = \frac{1}{(1-D)/(R1 \cdot C) + D/(R0 \cdot C)} \cdot Ln\frac{\alpha}{\alpha - VrefA} \qquad (4)$$

$$= f2\{Wd(D)\}$$

where $$R0 + R2 + R3$$

$$\alpha = \frac{V0\{1 - \exp\text{-}DT/(R0 \; C)\}}{1 - \exp\text{-}\{-(1-D)T/(R1 \cdot C) + (DT/R0)\}}$$

$$= g(D)$$

In the expression (3), therefore, f2 is a function of Wd, and varies with R0 (=R2+R3) as a parameter.

Since Wd is simply proportional to the duty factor D, the function f2 is also a function of D. That is, in FIG. 6, the axis of abscissa can be replaced directly with the duty factor D. Accordingly, the alarm curve can be moved by varying the parameter R0. Thus, the alarm curve moves away from the origin as the parameter R0 increases.

Figure 7:
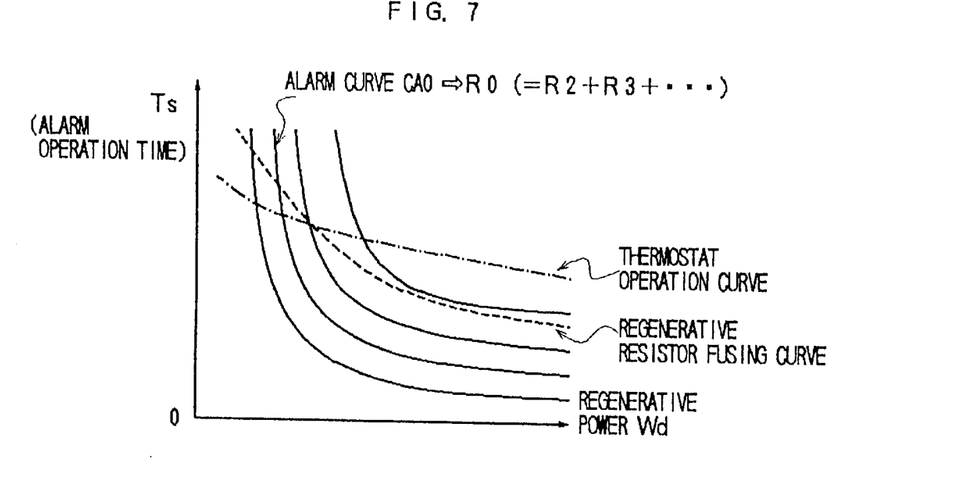
FIG. 7 is a diagram for illustrating setup of alarm curves based on the analog simulation circuit.

Steps S4 and S5: Then, alarm curves CA based on the analog simulation circuit are set compared with the fusing curve indicating the fusing characteristic of the regenerative resistor and the operation curve of the thermostat. FIG. 7 is a diagram for illustrating setup of the alarm curves CA of the analog simulation circuit 1. The fusing characteristic of the regenerative resistor 5 is inherent in the regenerative resistor 5 itself, and this fusing characteristic is primarily dependent on the employed regenerative resistor. In FIG. 7, this fusing characteristic of the regenerative resistor is represented by a broken-line curve.

The operation characteristic of the first protecting device using the thermostat 2 is also inherent in the thermostat 2 itself, and this operation characteristic is univocally determined by the employed thermostat. In FIG. 7, this operation characteristic of the thermostat is represented by a dashed-line curve.

On the other hand, the characteristic of the analog simulation circuit, as the second protecting means used for the regenerative resistor protection according to the present invention, can be adjusted in the aforesaid manner, whereby fusing regions of the regenerative resistor that cannot be protected by the first protecting device can be adjusted so as to be within the protective regions.

In FIG. 7, an alarm curve CA that can cover the region of the regenerative resistor fusing curve which is not covered by the thermostat operation curve is selected from among a plurality of alarm curves CA represented by full lines. In FIG. 7, of the four alarm curves CA, those three situated nearer to the axis of ordinate are selectable alarm curves CA.

In this example, the alarm curve CA0 is set as shown in the figure so that it covers the region of the regenerative resistor fusing curve which cannot be covered by the thermostat operation curve plus some margin.

Then, it is determined whether or not the set alarm curve CA0 is an appropriate alarm curve. If an appropriate alarm curve CA cannot be selected, the program returns to Step S1, whereupon the circuit configuration of a different analog simulation circuit is set, and the aforesaid processes of Steps S2 to S5 are executed.

Step S6: After the alarm curve CA0 is set, the combined resistor R0 (=R2+R3), which is used as the parameter for determining the relational expression f2, is obtained from the relational expression f2 corresponding to the alarm curve CA0.

Step S7: An alarm operation time Ts0 for the protection of the regenerative resistor is set. This alarm operation time Ts0 determines a characteristic for the protection of the regenerative resistor. A preset value is used for the alarm operation voltage VrefA.

Step S8: The circuit constant of the charge-discharge circuit, which performs the alarm operation at the alarm operation time Ts0 with the characteristic of the alarm curve CA0, is obtained from R obtained in step 6 and the alarm operation time Ts0 set in Step S7.

In order to obtain the circuit constant of the charge-discharge circuit, the capacitor C1 and the resistors R1, R2 and R3 are set by substituting values of D0 and Ts0 for D and Ts in the aforesaid relational expression f1 for the charge-discharge characteristic.

Step S9: It is determined whether or not the circuit constants of the analog simulation circuit, including values of the capacitor C1, resistors R1, R2 and R3, etc. set in the aforesaid process of Step S8, have appropriate and practical values.

If the set circuit constants have inappropriate values, the program returns to Step S1, whereupon the circuit configuration of a different analog simulation circuit is set, and the aforesaid processes of Steps S2 to S9 are executed.

Step S10: If the set circuit constant have appropriate values, the analog simulation circuit is constructed based on these circuit constants.

The analog simulation circuit can be changed in configuration in Steps S5 and S9 by changing the switch SW shown in FIG. 2 to vary the charge time constant.

Figure 8:
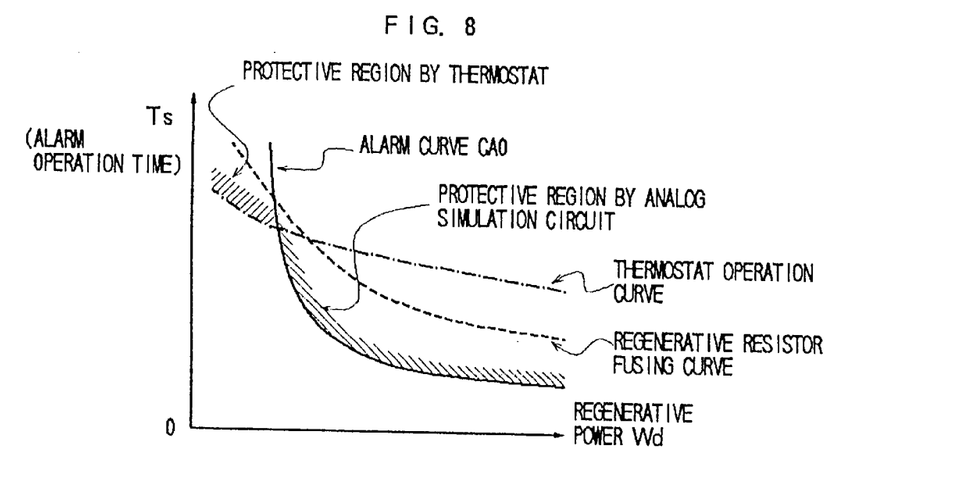
FIG. 8 is a diagram for illustrating a protective region of the regenerative resistor using the analog simulation circuit.

FIG. 8 shows an example of a protective region for the regenerative resistor determined using the analog simulation circuit set in accordance with the aforesaid flowchart. Referring to FIG. 8, a regenerative resistor fusing curve is within at least one of protective regions covered by the thermostat and the analog simulation circuit, so that the regenerative resistor can be continuously protected by the thermostat and/or the analog simulation circuit.

Figure 9:
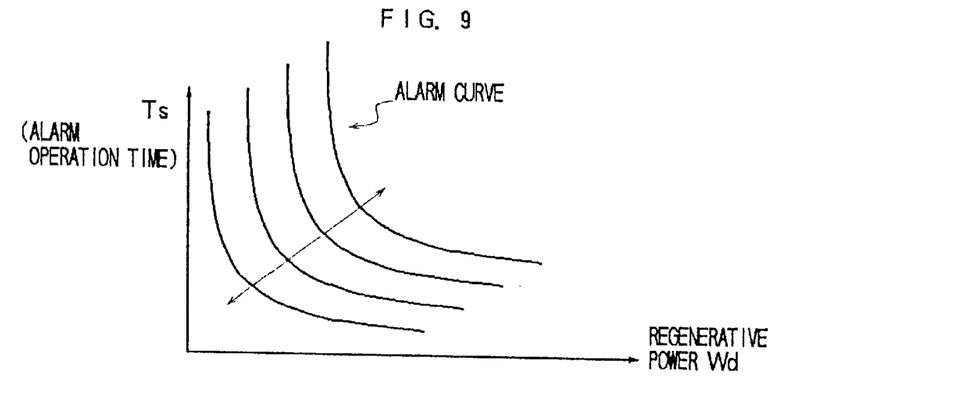
FIG. 9 is a diagram for illustrating the adjustment of the alarm curves based on the analog simulation circuit of the present invention.

According to the analog simulation circuit configuration of the present invention, the alarm curve CA can be adjusted by R0 (=R2+R3) as the parameter, and the movement of the alarm curve CA in FIG. 9 for adjustment can simultaneously be made with respect to the two axes for the regenerative power Wd and the alarm operation time Ts. This can be achieved by the configuration of the analog simulation circuit according to the present invention.

This indicates that the characteristic of the analog simulation circuit of the present invention can be adjusted with respect to both the axes for the regenerative power Wd and the alarm operation time Ts, and that the characteristic of the analog simulation circuit can be adjusted easily for the fusing characteristic of the regenerative resistor.

Figure 10:
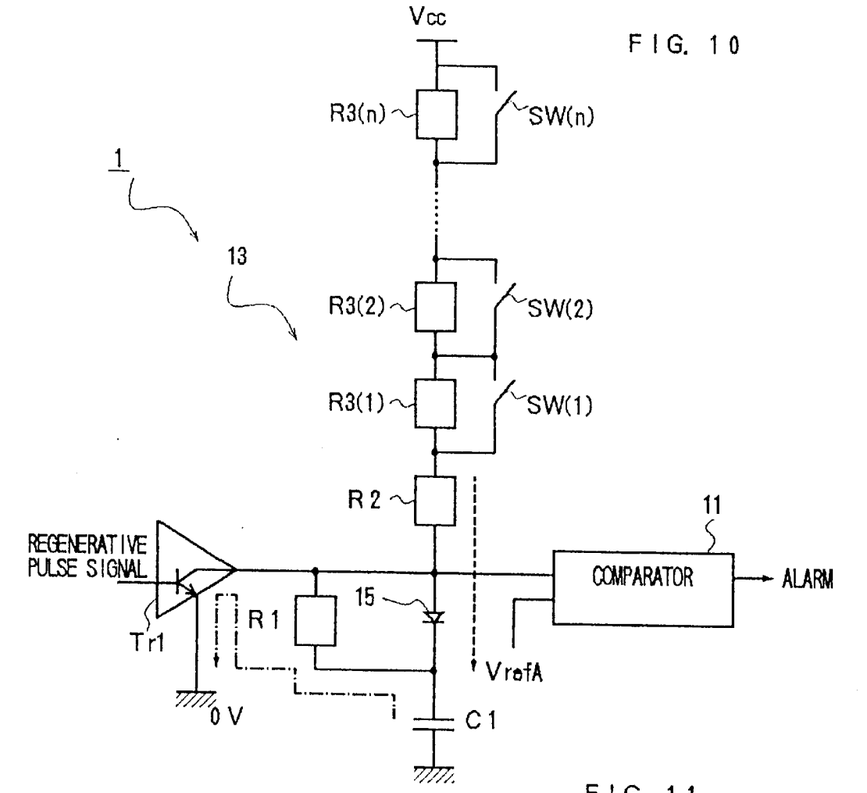
FIG. 10 shows another example of the arrangement of the analog simulation circuit of the present invention.

FIG. 10 shows another example of the configuration of the analog simulation circuit according to the present invention. In a charge-discharge circuit 13, a plurality of resistors R3(1) to R3(n) are connected in series with a resistor R2, and the charge-discharge time constant can be varied by changing over switches SW(1) through SW(n).

This analog simulation circuit operates substantially in the same manner as the analog simulation circuit shown in FIG. 2, except for the charge time constant of the charge-discharge circuit 13.

Figure 11:
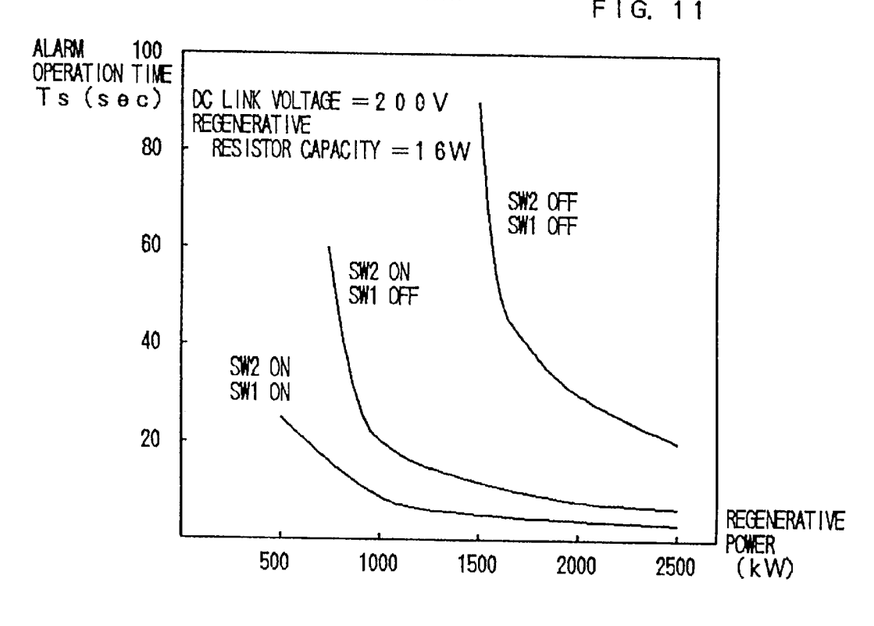
FIG. 11 illustrates a simulation effect of the analog simulation circuit of the present invention.

FIG. 11 shows a simulation result in the case where R1=750 k$\Omega$, R2=R3=390 k$\Omega$, R4=82 k$\Omega$, C1=33 $\mu$F, VrefA= 10 V, and Vcc=15 are used.

The present invention can provide a protecting method and a protection circuit for a regenerative resistor in an inverter for a servomotor in which a regenerative resistor is satisfactorily protected from the thermal breakage caused by the over-regeneration. Moreover, the present invention can provide a regenerating resistor protecting method and a protection circuit for a regenerative resistor in an inverter for a servomotor in which protective regions for a regenerative resistor are coordinated when combining a protection of the regenerative resistor by a thermostat and a protection of the regeneration resistor by an analog simulation circuit.

We claim:

1. An apparatus for protecting a regenerative resistor provided in a DC link connecting a DC power source and an inverter for controlling a servomotor, comprising:

level detecting means for detecting a voltage produced in said DC link by a regenerative power from said servomotor and for outputting a regenerative pulse signal when the detected voltage exceeds a first reference voltage;

switching means for applying a DC link voltage to said regenerative resistor in response to said regenerative pulse signal;

first protecting means for protecting said regenerative resistor by stopping power supply to said DC link when a temperature of said regenerative resistor increases to a predetermined value or greater; and second protecting means having a charge-discharge circuit to be charged and discharged in response to said regeneration pulse signal outputted from said level detecting means and a comparator circuit for comparing the voltage of said charge-discharge circuit with a second reference voltage, for protecting said regenerative resistor by stopping power supply to said DC link when the voltage of said charge-discharge circuit exceeds said second reference voltage, wherein a fusing region of said regenerative resistor is adjusted to be within at least one of a protective region of said first protecting means and a protective region of said second protecting means.

2. An apparatus for protecting a regenerative resistor provided in a DC link connecting a DC power source and an inverter for drivingly controlling a servomotor, comprising:

level detecting means for detecting a voltage produced in said DC link by a regenerative power from said servomotor and for outputting a regenerative pulse signal when the detected voltage exceeds a first reference voltage;

switching means for applying a DC link voltage to said regenerative resistor in response to said regenerative pulse signal; and regenerative resistor protecting means having a charge-discharge circuit to be charged and discharged in response to said regenerative pulse signal outputted from said level detecting means and a comparator circuit for comparing the voltage of said charge-discharge circuit with a second reference voltage, for protecting said regenerative resistor by stopping power supply to said DC link when the voltage of said charge-discharge circuit exceeds said second reference voltage, wherein a fusing region of said regenerative resistor is adjusted to be within a protective region of said regenerative resistor protecting means.

3. An apparatus protecting a regenerative resistor according to claim 1, wherein the protective region of said second protecting means is adjusted by varying a time constant for charging of said charge-discharge circuit.

4. An apparatus protecting a regenerative resistor according to claim 3, wherein said charge-discharge circuit has a capacitor and a resistor connected in series with said capacitor, and said time constant for charging is adjusted by varying the resistance value of said resistor.

5. A method of protecting a regenerative resistor which is provided in a DC link connecting a DC power source and an inverter for drivingly controlling a servomotor, comprising the steps of:

(a) performing a first protecting operation of stopping power supply to said DC link when a temperature of said regenerative resistor is increased to a first predetermined value or greater;

(b) performing a second protecting operation of estimating a quantity of heat accumulated in said regenerative resistor by a charge-discharge circuit to be charged and discharged in response to said regenerative pulse signal and stopping power supply to said DC link when the estimated quantity of heat exceeds a second predetermined value; and (c) adjusting said charge-discharge circuit so that first protecting operation and said second protecting operation continuously protect a fusing region of said regenerative resistor.

6. A method of protecting a regenerative resistor which is provided in a DC link connecting a DC power source and an inverter for drivingly controlling a servomotor, and supplied with a DC link voltage in response to a regenerative pulse signal, said method comprising the steps of:

(a) setting a protective region of first protecting means for stopping power supply to said DC link when a temperature of said regenerative resistor is increased to a first predetermined value or greater;

(b) setting a protective region of second protecting means for estimating a quantity of heat accumulated in said regenerative resistor by a charge-discharge circuit to be charged and discharged in response to said regenerative pulse signal and for stopping power supply to said DC link when the estimated quantity of heat exceeds a second predetermined value so that a fusing region of said regenerative resistor not covered by said first protecting means is covered; and (c) setting the circuit constant of said charge-discharge circuit having said protective region.

7. A method of protecting a regenerative resistor which is provided in a DC link for connecting a DC power source and an inverter for drivingly controlling a servomotor, comprising the steps of:

(a) providing first protecting means for stopping power supply to said DC link when a temperature of said regenerative resistor is increased to a first predetermined value or greater;

(b) providing second protecting means having a capacitor and a resistor connected in series with said capacitor, for estimating a quantity of heat accumulated in said regenerative resistor by a charge-discharge circuit to be charged and discharged in response to said regenerative pulse signal and for stopping power supply to said DC link when the estimated quantity of heat exceeds a second predetermined value;

(c) determining a plurality of charge-discharge characteristics of said charge-discharge circuit based on the capacity of said capacitor of said second protecting means and the resistance value of said resistor as parameters;

(d) selecting a charge-discharge characteristic capable of covering a fusing region of said regenerative resistor, which is not covered by the protecting region of said first protecting means, from among said plurality of charge-discharge characteristics; and (e) obtaining the value of said parameters in accordance with said selected charge-discharge characteristic to determine said charge-discharge circuit.

* * * * *

UNITED STATES PATENT AND TRADEMARK OFFICE
CERTIFICATE OF CORRECTION

PATENT NO. : 5,814,954
DATED : September 29, 1998
INVENTOR(S) : Suzuki et al.

It is certified that error appears in the above-identified patent and that said Letters Patent is hereby corrected as shown below:

Title Page, [75], change "Oshino-mura" to --Minamitsuru--.

Col. 2, line 56, change "bore" to --before--.

Col. 8, equation (4) after "where", R0+R2+R3" should be --R0=R2+R3-- equation (4), line 36, "(DT/{R0 $^c$})} should be --(DT/{R0·$^c$})}--.

Col. 10, line 23, after "15" insert --V--.

Col. 11, line 47, after "that" insert --said--.

Signed and Sealed this

Seventh Day of September, 1999

Attest:

Q. TODD DICKINSON

*Attesting Officer*   *Acting Commissioner of Patents and Trademarks*